Sept. 19, 1950         O. V. JENKINS         2,523,024
PEANUT AND GRASS HARVESTER
Filed June 9, 1948         4 Sheets-Sheet 1
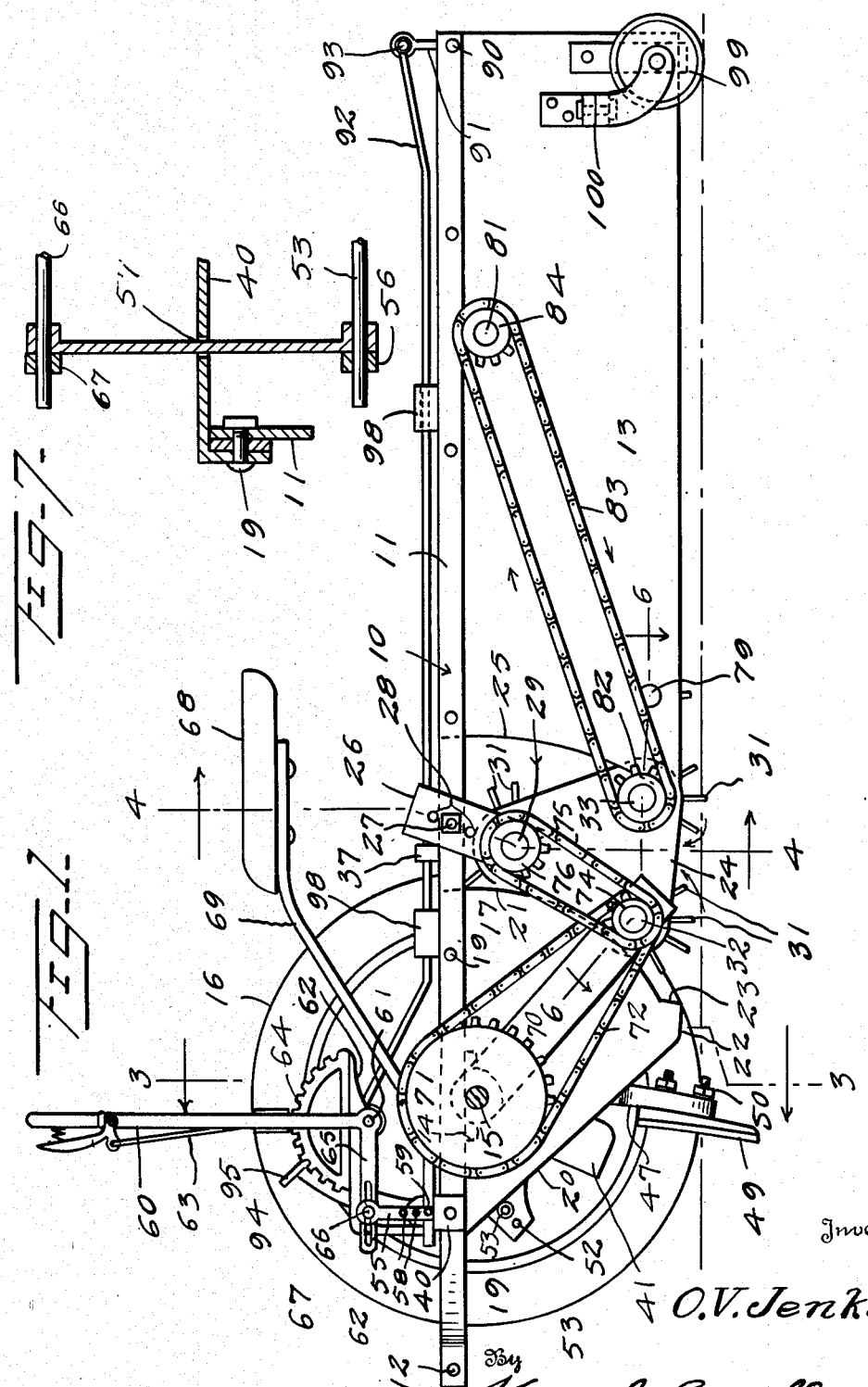
Inventor
O. V. Jenkins
By Kimmel & Crowell Attorneys

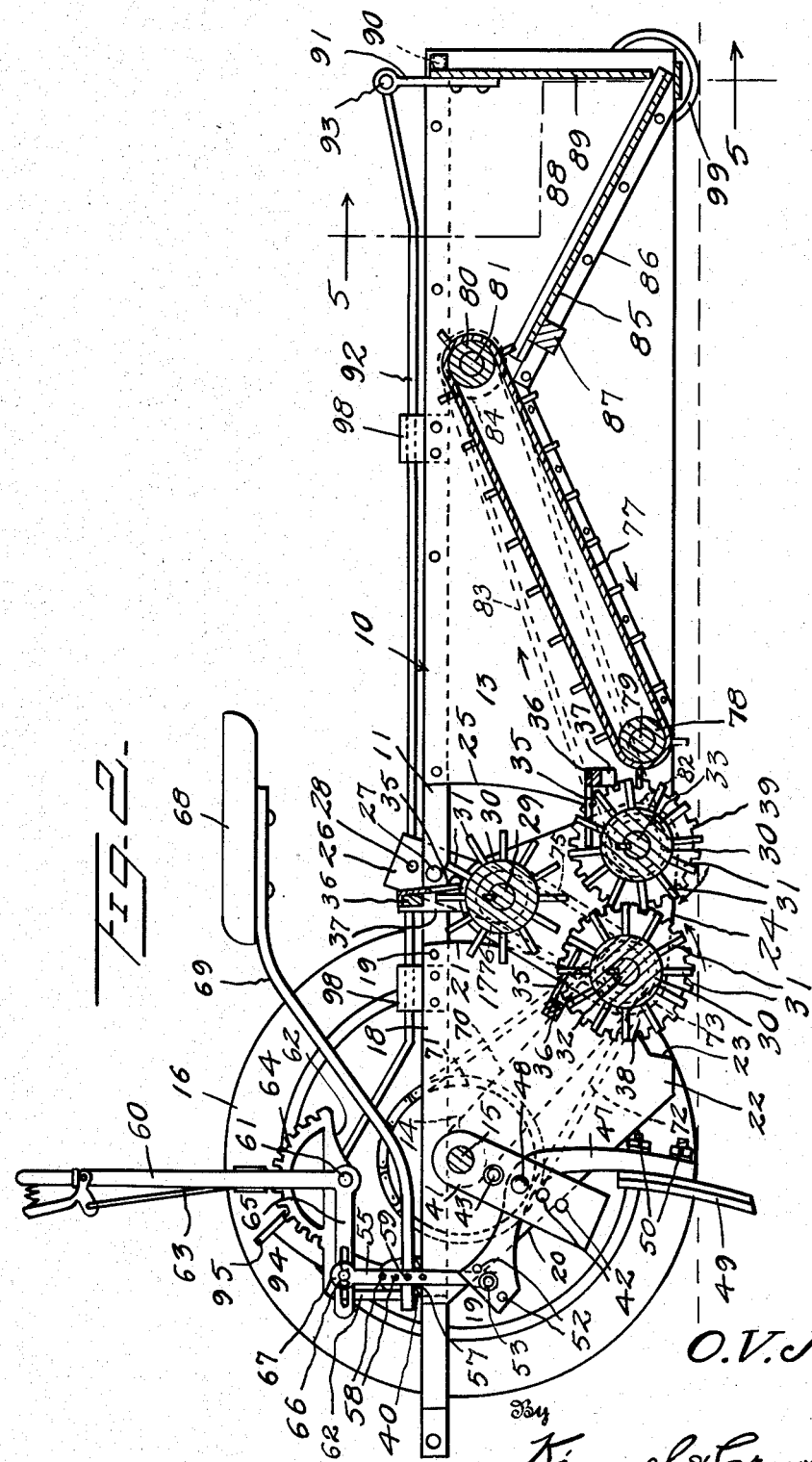

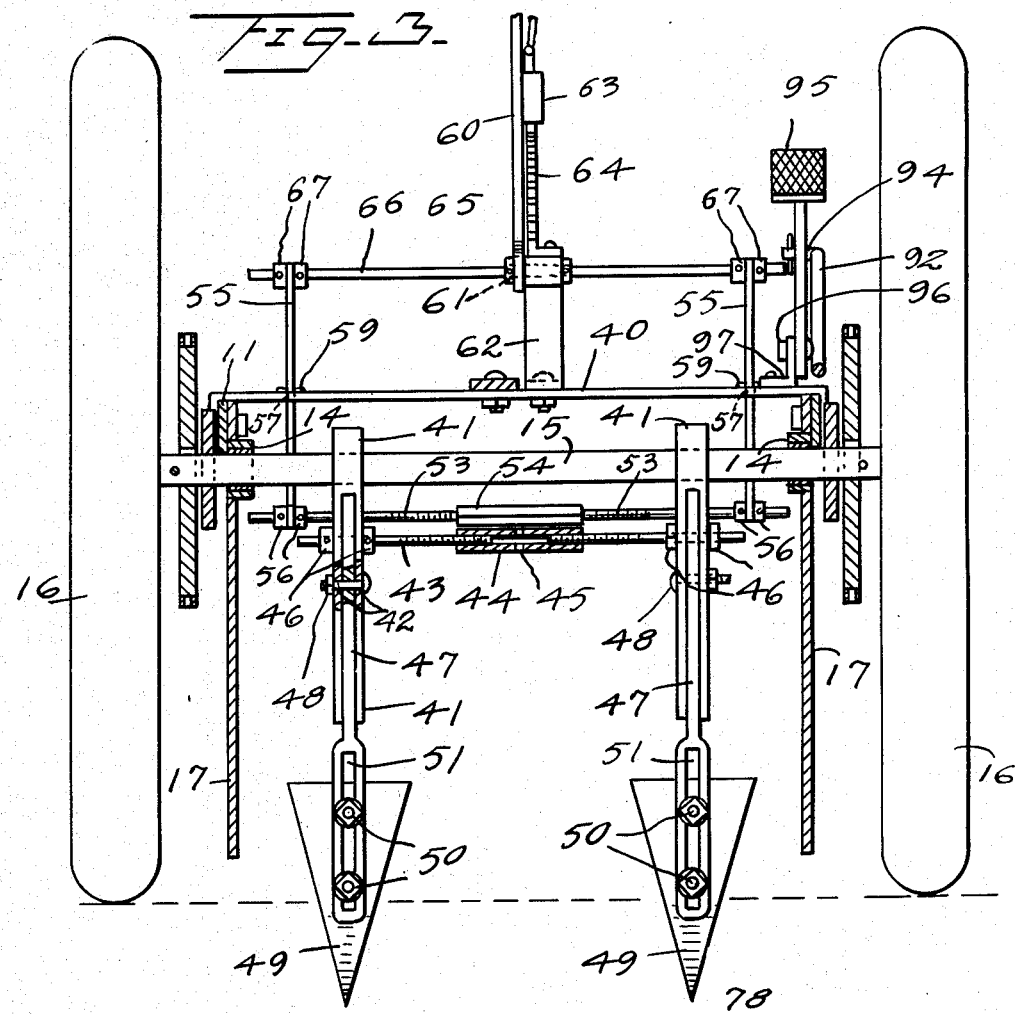
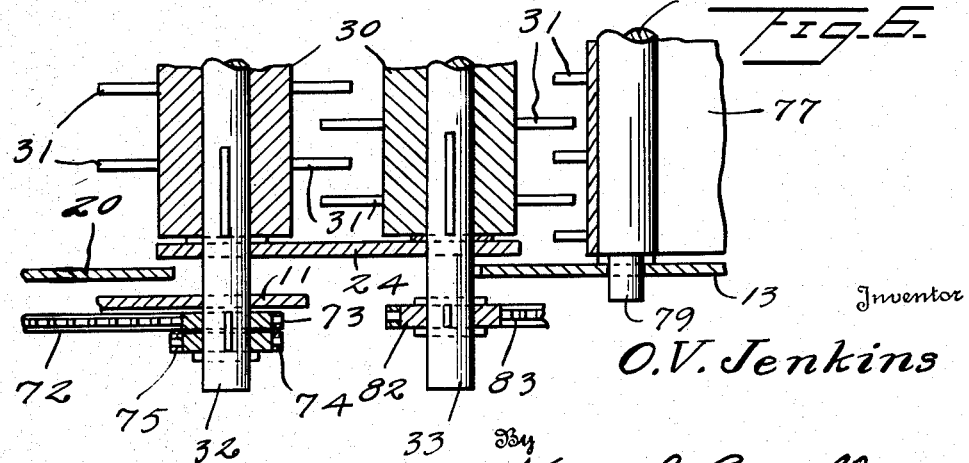

Sept. 19, 1950     O. V. JENKINS     2,523,024
PEANUT AND GRASS HARVESTER
Filed June 9, 1948     4 Sheets-Sheet 4
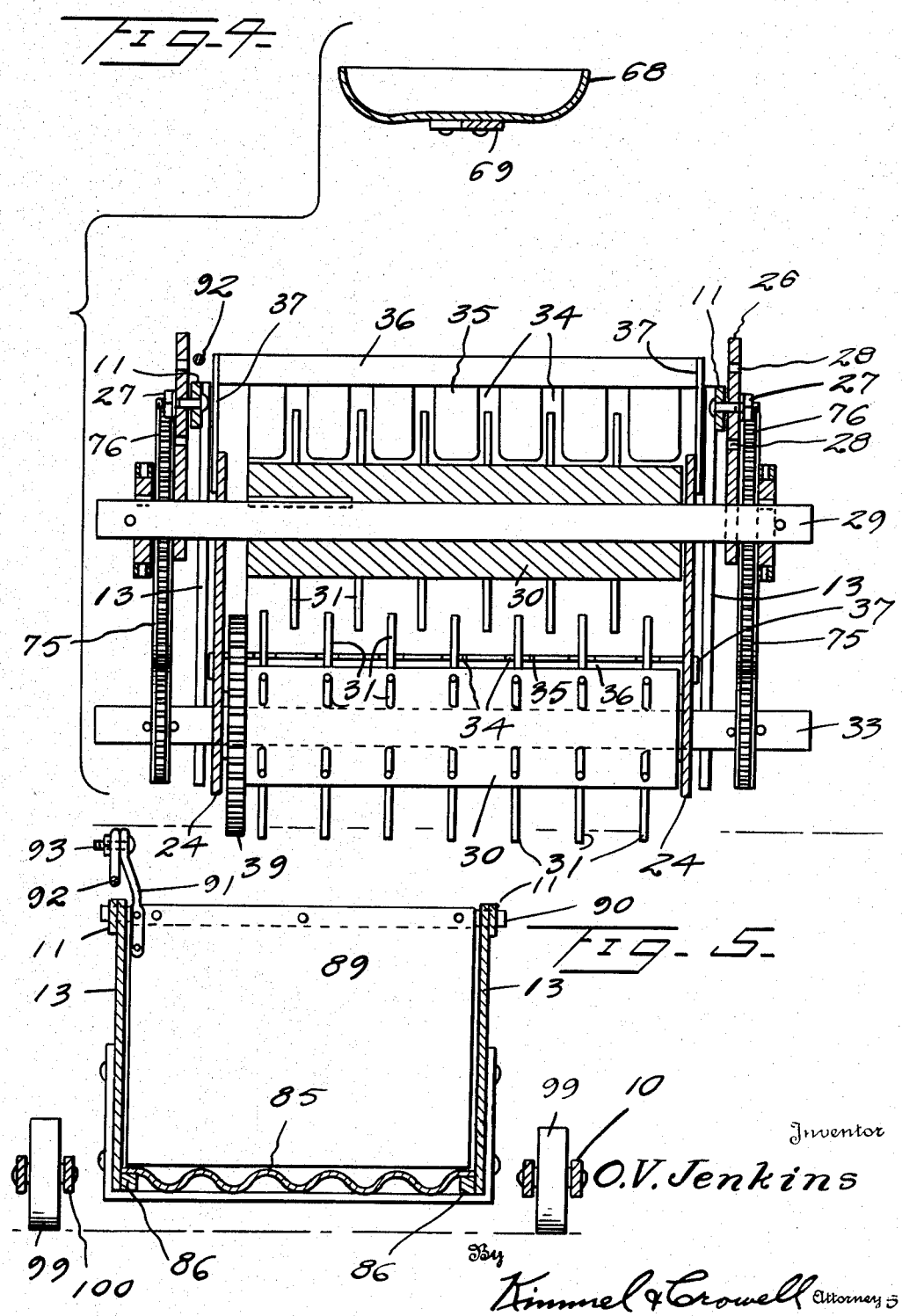
Inventor
O. V. Jenkins
By Kimmel & Crowell Attorneys Patented Sept. 19, 1950

2,523,024

UNITED STATES PATENT OFFICE 2,523,024

PEANUT AND GRASS HARVESTER

Otis V. Jenkins, Wrightsville, Ga., assignor of twenty-three and one-third per cent to H. C. Mayo, Sr., twenty-three and one-third per cent to H. T. Hicks, and twenty per cent to A. G. Bell, all of Wrightsville, Ga.

Application June 9, 1948, Serial No. 31,945

6 Claims. (Cl. 55—9)

My invention relates to a machine for harvesting peanuts and grass, the device being adapted to plow or dig up the peanut plants and rooted peanuts or other similar plants and grasses, such as Bermuda or quack grass or the like, and to pick up and convey the plants or grass through devices to separate and remove the earth from the plants and subsequently and finally discharge or dump the same at the rear of the machine when sufficient quantity has collected therein, in stacks or piles in a field, to be collected and hauled away.

An object of the invention is to provide an agricultural machine which is advanced across a field by draft animals or a tractor and which includes a wheeled frame having adjustable cultivator-like plows at the front for digging up the plants or grasses and in the rear thereof including oppositely rotatable rollers with spikes for picking up the plants or grass thus dug up, from the surface of the soil and causing the earth picked up therewith to be separated or shaken from the plants or grass to drop to the ground and means in the form of an endless conveyor with spikes to receive and remove the plants or grass from the rollers and to elevate and carry the same to the rear of the machine to a receiving receptacle or trough from which the collected plants or grass can be dumped when full, at the will of the operator or driver, in piles or stacks on the ground, to be gathered and transported away for removing the peanuts or other crop therefrom and further use of the plant parts or grass as desired.

Another object is to provide not only for adjustment of the depth at which the plows dig, but means for allowing movement of the rollers up and down according to the surface of the terrain or to pass over obstructions and prevent injury to the rollers and spikes, or for raising or lowering the rollers relative to the ground surface for most effective gathering and lifting and conveying action, and means cooperative with the spikes of the rollers to remove the dirt from the plants or grass so that only the latter will be conveyed to the receiving and collection receptacle for discharge when the receptacle is full, said discharge being effected by the driver or operator while the machine is traveling across a field of plants or grass and without stopping the machine or getting out of the driver's seat provided on the wheeled frame of the machine.

With the above and other objects in view, my invention consists in the arrangement, combination and details of construction disclosed in the drawings and specification, and then more particularly pointed out in the appended claims.

In the drawings,

Figure 1 is a side elevation of a peanut and grass harvester embodying my invention, Figure 2 is a vertical longitudinal sectional view, Figures 3 and 4 are transverse vertical sectional views taken on the lines 3—3 and 4—4 of Figure 1, Figure 5 is a transverse vertical sectional view taken on the line 5—5 of Figure 2, Figure 6 is an enlarged horizontal sectional view taken on the line 6—6 of Figure 1; and Figure 7 is a detail vertical sectional elevation of the support for the throw lever for raising and lowering the plows.

Referring to the drawings, 10 designates a wheeled frame having horizontal longitudinal top side rails or bars 11 converging toward each other at the front as at 12 and connected for attachment to hitching means for draft animals or a tractor as means for pulling or drawing or otherwise advancing the machine across a field of plants such as peanuts, or grass. Longitudinal side bars 11 carry depending parallel sides 13 at their rear portions forming a body open at the top, bottom and front and rear ends, and said side bars 11 toward the front carry bearings 14 in which a horizontal transverse rotatable front axle or shaft 15 is journaled across the frame. The ends of shaft 15 project to mount front transporting and driving wheels 16 which may be of the pneumatic rubber tired type.

Fixed to and depending from the front portions of the top side bars in alignment with sides 13 are segmental side plates 17 having their upper radial edge portions 18 bolted to the side bars 11 as at 19, rearwardly inclined radial edges 20 at the front and bottom and convexly arcuate rear edges 21 concentric to the shaft 15. Plates 17 may be formed with extensions 22 at the juncture of edges 20 and 21 forming rearwardly facing stop or limit shoulders 23. Triangular side plates 24 disposed with their lower edges slightly inclined rearwardly and tapered toward the top, are disposed within sides 13 and plates 17 in overlapping relation to convex edges 21 and concaved forward edges 25 of sides 13. Plates 24 are pivotally suspended from the side bars 11 of the frame 10 as by means of hangers 26 which are capable of vertical adjustment through the medium of bolts 27 disposed through bars 11 and any one of a plurality of holes 28 in rows through the hangers 26. A horizontal shaft 29 is journaled in hangers 26 and extends through openings in the upper ends of the plates 24 to pivotally support same. Shaft 29 has a spiked roller 30 having radial spikes 31 and is driven in a counter-clockwise direction as will be later explained.

At the bottom of the plates 24 front and rear horizontal shafts 32 and 33 are journaled in parallel relation to each other and upper shaft 29. Fixed to shafts 32 and 33 are similar rollers 30 with spikes 31, with the roller of upper shaft 29 therebetween, but it will be noted that while the spikes of the upper roller are spaced from the spikes of the lower rollers, the spikes of the latter intermesh or overlap. Also, the spikes of the respective rollers operate through slots 34 of slotted plates or combs 35 having bars 36 fixed at arms 37 to the outer faces of the triangular plates 24. The plate or comb 35 at the top depends with its slotted edge downwardly in a substantially upright position, while the plates or combs 35 of the lower rollers extend and incline rearwardly from the forwardly inclined forward edges of plates 24 and horizontally forwardly from the rearwardly inclined rear edges thereof respectively somewhat tangentially to the peripheries of the lower rollers but spaced therefrom. Intermeshing gears 38 and 39 are fixed to shafts 32 and 33 to rotate therewith in counter-clockwise and clockwise directions respectively as seen in Figures 1 and 2, so that the front roller and its teeth move upwardly at the back, while the rear roller and its teeth move upwardly at the front or in the opposite direction with respect to the front roller to pick up and carry the plants or grass upwardly therebetween.

At the front and top, the sides of the frame 10 are connected by a cross bar or brace 40 between side bars or rails 11. Shaft 15 pivotally supports a plurality such as two spaced forwardly inclined depending edgewise slotted or bifurcated arms or hangers 41 each provided with a row or plurality of longitudinally spaced holes 42, the uppermost of which takes the ends of lengthwise adjustable connecting and spacing rod 43 for arms 41. Rod 43 comprises oppositely threaded sections connected by an opposite threaded spanner nut or turnbuckle 44 with sockets 45 to receive a pin or nail to turn it and adjust the length thereof. Spaced set collars 46 are mounted on the sections on opposite sides of the arms 43 to adjust the spacing thereof by the turnbuckle connection. Arms 41 receive angular cultivator plow shanks or standards 47 which are pivoted in aligned holes 42 as by bolts 48, and the lower ends of standards 47 carry plow blades 49 to operate in the rows of plants or grasses in the field and dig up the peanut plants or the like, or grass and roots thereof. These blades are bolted at 50 through slots 51 in the feet of the standards. Rod 43 also limits the movement of the standards on their pivots.

The upper ends of the standards 47 are enlarged and provided with a plurality of apertures 52 to adjustably take a similar adjustable turnbuckle rod 53 having a spanner nut or turnbuckle 54. The ends of rod 53 are engaged through the lower ends of upwardly extending links 55 straddled by set collars 56 and slidably disposed through slots 57 in cross bar or brace 40 and provided with apertures 58 to take pins 59 for holding the links and plows in different vertically adjusted positions. An adjustable throw lever 60 is pivoted at 61 on a bearing bracket 62 supported on frame 10 as at cross brace or bar 40, has a hand latch 63 cooperating with a notched quadrant 64 and a rigid crank arm 65 pivotally connected to a cross rod 66 connecting the upper ends of the links 55 with set collars 67 on rod 66 straddling links 55 to maintain their positions in spaced relation thereon. By this means, the lever 60 may be operated by the driver from the operator's seat 68 supported on the frame by a post 69 from cross brace or bar 40 to raise or lower the plows 49 by raising or lowering the links 55 and through the connections of the latter at 53 with the angular standards 47 to swing the latter on their pivots 48. Also, since the pivots 48 of the plow standards 47 are carried by the arms or hangers 41 pivotally hung from the shaft 15, the movement of the rod 53 in an arc will be compensated for by the swing of the hangers 41 to raise or lower and change the pitch of the plow blades. In addition, the plows may be manually adjusted vertically to regulate the depth of the cut or digging in the soil by adjusting the positions of the pivot bolts 48 in the holes 42 which also varies the angular positions and pivotal action of the standards 47 and the plow blades 49 carried thereby.

In addition to the plates 24 and spiked or toothed rollers carried thereby and journaled therein being pivotally suspended by the hangers 26 at pivot 27, said plates are also suspended from shaft 15 by rearwardly inclined arms 70 pivoted on shaft 15 at their forward upper ends and at their rear lower ends to shaft 32 to allow the plates 24 and lower spiked rollers to ride or swing up and down on hangers 26, shaft 29 and arms 70 to compensate for unevenness in the ground. It should also be noted that while the spiked roller of shaft 33 is normally slightly lower than the spiked roller on the shaft 32, the pivotal suspension of these rollers and plates 24, allows said rollers to assume the same horizontal plane. Sprocket wheels 71 are fixed to the ends of shaft 15 and endless drive chains 72 are trained thereon and around smaller sprocket wheels 73 fixed on the ends of shaft 32 to drive the latter in the same direction as wheels 16. Sprocket wheels 74 are also fixed to shaft 32 and endless chains 75 are trained thereon and around sprocket wheels 76 fixed on the ends of shaft 29 to drive the upper spiked roller in the same direction with the spikes moving rearwardly at the bottom.

By reason of the gears 38 and 39, the shaft 33 and spiked roller thereof are driven in a direction opposite to that of shaft 32 and spiked roller carried thereby to lift the plants or grass therebetween to be moved rearwardly by the spikes of the roller on shaft 29. An endless spiked or toothed conveyor 77 operates around a lower forward roller 78 fixed on a shaft 79 journaled in sides 13 near the bottom and adjacent concaved edges 25 which permit shaft 33 to swing up and down in an arc. The upper rear portion of conveyor 77 operates around a roller 80 fixed on a shaft 81 also journaled in sides 13 near the top but spaced from the rear end of the frame and body formed by sides 13, which however, is open at the top and bottom. Shaft 33 has sprocket wheels 82 fixed on the ends thereof and endless drive chains 83 are trained thereon and around similar sprocket wheels 84 fixed to the ends of shaft 81 to drive the endless conveyor 77 so that the upper stretch or lap thereof travels rearwardly and upwardly at an incline.

A rearwardly inclined bottom 85 is supported on side strips 86 secured to the inner faces of sides 13 and a cross bar 87 at its front end so as to form a trough 88 into which the plants or grasses are discharged from the rear end of the conveyor after most of the dirt has been removed therefrom and drops to the ground from the spiked rollers and conveyor to which the harvested material is delivered by the rollers. The trough is provided with a tail gate 89 pivoted at the top as at 90 between sides 13 in bars 11 to be opened rearwardly at the will of the operator or driver from the seat 78 to deposit the material onto the ground in piles to be collected and hauled away. For this purpose, tail gate 89 has an upwardly extending arm 91 to which the upraised rear end of a rod 92 is pivoted at 93, said rod 92 being pivotally connected at its forward end as at 94 to a foot lever 95 pivoted at 96 to a bearing bracket 97 on cross bar 40. Rod 92 slides in guides 98 on one side 13 and its top side bar 11, so that by depressing foot lever 95, forward pull is exerted on rod 92 and arm 91 to raise the tail gate 89 at the bottom to a rearwardly tilted open position and permit the peanut or other plants or grasses deposited in the trough 88 to be discharged or drop out to the ground owing to the rearward inclination of the bottom 85 of the trough. The rear end of the machine is supported on casters 99 having their forks swivelled to turn at 100 in suitable bearing brackets at the rear end and sides of the frame and body so that the rear end of the machine will turn when steering or making turns in either direction and for making sharp turns at the ends of a field or corners thereof without raising or lifting the rear end of the machine off of the ground, or even stopping the operation of the machine in harvesting the peanut or other plants or grasses.

In the operation of the machine, the same is advanced across a field of peanut plants, grass or the like after the plows have been adjusted to the proper depth to properly plow or dig up the plants or grass, by adjustment of the bolts 43 in the holes 42 of the hangers 41 and proper spacing of the plows at the rod 43. The plows are then lowered by the lever 60 and set at the proper pitch and depth depending upon the depth of cut required to effectively plow or dig up the plants or grass and roots thereof in the ground through the medium of the connection of the lever 60 with the plow standards by the links 55 to rock the standards on the pivots 48. The spiked rollers are raised or lowered as required by adjustment of the hangers 26 and plates 24 at the bolts 27. As the machine is advanced, the plows 49 plow up the plants or grass and roots thereof together with the soil and the plants or grass are caught in the spikes 31 of the roller 30 of the shaft 32 to be dragged or passed under the same partly breaking up lumps in the soil and causing some of the soil to fall to the ground. The plants or grasses are then picked up by the spikes of the roller attached to the shaft 33 and passed upwardly between the spikes of said rollers to further loosen and remove the soil which falls to the ground. The plants or grasses are prevented from passing around with the rollers and removed from the spikes thereof as the latter pass through the slotted plates or combs 35 and removed therefrom. At this point, the spikes of the roller on the shaft 29 take hold of the plants or grasses and move the same rearwardly onto the lower rear end portion of the spiked conveyor 77 to be carried upwardly and rearwardly to deposit the same in the trough 88. Any plants or grasses carried upwardly by the spikes on the roller of the shaft 29 will be removed therefrom by the slotted plate or comb 35 at the top thereof and because of its upright position, caused to fall onto the conveyor 77 to be carried up with the rest of the plants or grasses. At suitable times, the plants or grasses collected in the trough 88 are discharged in piles or stacks on the ground by the driver or operator pressing downwardly on the foot lever or pedal 95 to draw the rod 92 forwardly and by connection with the arm 91 to raise and open the tail gate 89 so that the plants or grasses in the trough 88 will slide down the inclined bottom 85 and fall onto the ground without stopping the advance of the machine. The harvester is effective for plowing up peanut plants or the like, grasses, clover, alfalfa and the like efficiently and economically, to plow up the same and remove the dirt therefrom as well as breaking up lumps and dropping the dirt to the ground so as to deliver the plants almost entirely free of dirt to the rear trough for discharge in piles onto the ground at desired intervals and at the will of the operator to be collected and hauled away. The construction is simple, one man may operate the machine which can be economically produced with a minimum of parts easily assembled to thoroughly and properly harvest peanut and other plants, and grasses such as Bermuda grasses or even clover, alfalfa, peas, beans, soy beans, or the like.

I do not mean to confine myself to the exact details of construction herein disclosed but claim all variations falling within the purview of the appended claims.

What I claim is—

1. In a harvesting machine of the class described, a wheeled frame, plows at the front of the frame, suitably driven spiked rollers in rear of the plows, means on the frames for holding the plows and rollers in alignment, said rollers being rotatable in opposite directions upwardly at their adjacent sides to pick up plants or grass dug up by the plows, another spiked roller above the first rollers to remove the plants or grass picked up thereby and delivered therebetween at the top, a trough at the rear of the frame, and a conveyor means driven corelatively relative to said rollers to convey the plants or grass from the rollers to the trough.

2. In a harvesting machine for peanut or like plants or grasses, a wheeled frame, hangers pivotally suspended from the frame, plows having standards adjustably pivoted to the hangers, means connected to standards to swing the same on their pivot and raise or lower the plows as well as change the pitch thereof, a pair of coacting spiked rollers rotatably driven in opposite directions in rear of the plows to move upwardly at their sides toward each other and pick up plants or grass dug up by the plows and break up lumps of dirt therebetween and separate the same from the plants or grass to drop to the ground as the plants or grass move upwardly between the rollers, a cleaner means having spaced members extending radially of the rollers between the spikes thereof to scrape the dirt from the plants, and a conveyor means suitably driven and spaced adjacent the rollers to move the plants rearwardly for disposal.

3. In a harvesting machine for peanut or like plants or grasses, a wheeled frame, hangers pivotally suspended from the frame, plows having standards adjustably pivoted to the hangers, means connected to standards to swing the same on their pivot and raise or lower the plows as well as change the pitch thereof, a pair of coacting spiked rollers rotatably driven in opposite directions in rear of the plows to move upwardly at their sides toward each other and pick up plants or grass dug up by the plows and break up lumps of dirt therebetween and separate the same from the plants or grass to drop to the ground as the plants or grass move upwardly between the rollers, plates supported in the frame and having slots through which the spikes of the rollers travel to remove the plants from the rollers, means above the rollers to receive and deflect the plants rearwardly, a conveyor suitably driven and receiving the plants from the rollers and latter means, a trough at the rear of the frame and conveyor receiving the plants from the latter, and means operable from the front of the frame to discharge the plants from the trough.

4. In a harvesting machine for peanut or like plants or grasses, a wheeled frame, hangers pivotally suspended from the frame, plows having standards adjustably pivoted to the hangers, means connected to standards to swing the same on their pivot and raise or lower the plows as well as change the pitch thereof, a pair of coacting spiked rollers rotatably driven in opposite directions in rear of the plows to move upwardly at their sides toward each other and pick up plants or grass dug up by the plows and break up lumps of dirt therebetween and separate the same from the plants or grass to drop to the ground as the plants or grass move upwardly between the rollers, plates supported in the frame and having slots through which the spikes of the rollers travel to remove the plants from the rollers, means above the rollers to receive and deflect the plants rearwardly, a conveyor suitably driven and receiving the plants from the rollers and latter means, a trough at the rear of the frame and conveyor receiving the plants from the latter, a tiltable tail gate for the back of the trough, and means for tilting said tail gate to open the same and discharge the plants therefrom.

5. In a peanut or other plant and grass harvesting machine, a wheeled frame, adjustable plows at the front of the frame, hangers adjustably and swingably supporting the plows, lever operated means on the frame and connected to the plows to swing the same up or down, side plates pivotally and adjustably hung from the sides of the frame in rear of the plows, a pair of oppositely driven rotatable spiked rollers carried at the bottom of the plates one in rear of the other to pick up the plants or grass dug up by the plows, another spiked roller rotatably carried by the plates at the top above the aforesaid rollers, arms pivoted on the frame and extending downwardly and pivotally connected to the plates at the bottom, means to drive said pair of rollers in unison, means to drive the upper roller from a lower roller, combs carried by the plates for movement of the spikes therethrough to remove the plants therefrom and separate the dirt therefrom to fall to the ground, an endless spiked conveyor mounted in the frame and extending upwardly and rearwardly from the rear lower roller and driven therefrom to convey the plants or grass therefrom, a trough at the rear of the frame receiving the plants or grass from the conveyor, said trough having a rearwardly inclined bottom and a tiltable tail gate, and foot operated means on the front of the frame and connected to the tail gate to tilt the latter and discharge the plants or grass therefrom onto the ground.

6. In a harvesting machine of the class described, a wheeled frame, digger means having a dependent pivotally mounted cutter plate at the front of the frame, a pair of suitably driven spiked rollers in rear of the digger having axes on substantially the same plane and rotatable in opposite directions upwardly at their adjacent sides to pick up plants or grass dug up by the digger, means extending between the frame and digger to adjust the depth of cut of the cutters, means extending from the frame to support the rollers to move up and down according to unevenness in the terrain, means above and in rear of the rollers having an endless conveyor suitably driven for movement correlated with rotation of the rollers to convey the plants or grass rearwardly and means to collect and discharge the plants or grass.

OTIS V. JENKINS.

REFERENCES CITED

The following references are of record in the file of this patent:

UNITED STATES PATENTS

| Number | Name | Date |
|---|---|---|
| 171,595 | Benson | Dec. 28, 1875 |
| 1,010,947 | Parker | Dec. 5, 1911 |
| 1,341,861 | Newdall | June 1, 1920 |
| 1,546,818 | Addler | July 21, 1925 |

FOREIGN PATENTS

| Number | Country | Date |
|---|---|---|
| 1,980 | Germany | Oct. 5, 1877 |
| 363,420 | France | May 2, 1906 |
| 278,416 | Great Britain | Oct. 3, 1927 |